Patented Mar. 10, 1931

1,796,240

UNITED STATES PATENT OFFICE

ADRIEN CAMBRON, OF OTTAWA, ONTARIO, CANADA, ASSIGNOR, BY MESNE ASSIGNMENTS, TO THE ROESSLER & HASSLACHER CHEMICAL COMPANY, OF NEW YORK, N. Y., A CORPORATION OF DELAWARE

ACCELERATOR FOR THE VULCANIZATION OF RUBBER

No Drawing. Application filed January 20, 1926, Serial No. 82,612. Renewed July 17, 1930.

The object of this invention is to provide a substance for aiding the vulcanization of rubber which will be cheap while at the same time powerful, rapid, non poisonous, hard but of low softening and melting point and of a brittle nature so as to allow of easy pulverization and distribution in a rubber mix. A further object is to provide in this same substance a material which will retard the aging of the finished rubber.

My invention comprises an improved product formed by the condensation of acetaldehyde with aniline in the presence of an acidic catalyst and includes a process of treating rubber, balata, gutta percha, or similar material with this improved acetaldehyde aniline condensation product and vulcanizing. My invention also includes the product of the process. This application concerns a species of material which is claimed broadly in an application S. N. 82,613 filed by me of even date herewith.

The condensation products of acetaldehyde and aniline have been used in various forms for some time as accelerators in the art of vulcanizing rubber. These substances vary greatly in nature and activity due to the varying methods of formation and to the many different ratios suggested and employed between the acetaldehyde and aniline. Most of these substances however are of an undesirable soft pitchy nature being neither hard materials nor free flowing liquids, because of this soft and sticky nature the material is extremely difficult to handle. Some of the so-called hard products are unsuitable in many cases since the ground particles agglomerate on standing. A recently suggested process is a secondary treatment of these soft materials with a further aldehyde addition after a primary condensation has been effected. I have found that such further aldehyde additions are unnecessary and a waste.

In my U. S. Patent 1,562,146 of Nov. 17, 1925, I have disclosed and claimed one method of preparing improved condensation products of aldehydes and amines and one application of this process is the formation of an improved acetaldehyde-aniline condensation product.

I have now discovered a new process of preparing a hard acetaldehyde-aniline condensation product. I have found that it is possible to obtain a hard product suitable for use as an accelerator of vulcanization of rubber by condensing the anilne and acetaldehyde in the presence of acid catalysts. This new product can be ground to a fine powder and will not agglomerate after grinding; it has excellent accelerating properties and greatly extends the life of the rubber article in which it is used. It has been proposed to prepare various rubber compounding materials such as age resistors, accelerators and conditioners from aldehydes and amines in aqueous acid solutions. In these, however, large amounts of acid are present and this not only alters the course of the reaction and produces a different type of product, but also serves with the water to dissolve out certain constituents of the mix. The product of this type of high acid reaction requires neutralization with alkalies and other treatment such as washing with water to render it suitable for use in rubber. My condensation product is prepared with acid catalysts in the substantial absence of water and has no definite melting point. I have found that high acid concentrations during the preparation of the condensate has unfavorable effects on the accelerating properties of the product. Furthermore the water removes constituents which are valuable in accelerating vulcanization.

One preferred method of practicing my invention is to use an acid zinc salt, such as zinc chloride, and a mineral acid, such as hydrochloric acid, in succession as the acidic catalysts in an acetaldehyde-aniline condensation reaction wherein two moles of acetaldehyde are used to each mole of aniline. I use the zinc chloride first for the purpose of securing a preliminary condensation so as to avoid a violent reaction due to the catalytic effects of the hydrochloric acid when it is added.

The total amount of acidic catalyst used is less than 5% of the weight of the acetaldehyde and aniline so that neutralization of the acid with alkalies is unnecessary. Furthermore the reaction is carried out with essentially dry acetaldehyde and aniline; thus the only water present is that due to the condensation reaction and that incidentally added with the catalyst. These points are given to clearly distinguish this process from those processes where substantial amounts of water are used as the reaction medium and considerable amounts of acid used to dissolve out certain constituents in the reaction product.

I preferably first prepare a catalyst consisting of an addition product of zinc chloride and aniline by mixing these in reacting proportions, e. g. 2 moles of aniline to one mole of zinc chloride. 0.22 lb. of this zinc chloride-aniline product is then added to 51.5 pounds of aniline in a jacketed kettle with thorough stirring to prevent the zinc chloride-aniline from settling out. Cooling water is now circulated in the kettle jacket and 50 lbs. acetaldehyde (1.3 pounds excess over the 2 molecular ratio to care for any vaporization loss) are run into the kettle; the pressure in the kettle is allowed to rise to about 10 pounds and the aldehyde addition regulated to maintain this pressure. The addition of the aldehyde takes about 1¾ hours. The pressure drops to near zero in about 15 minutes after the aldehyde has been added. One pound of 25% aqueous hydrochloric acid solution is now added in a period of 10–15 minutes, with stirring continued as before. Cooling water is still being circulated. Due to the catalytic effect upon adding the acid, the kettle temperature rises sharply, reaching about 80–85° C. As soon as this temperature begins to fall showing a completion of the major part of the reaction, the cooling water is shut-off and the water jacket emptied. Thus the heat of the reaction is utilized as fully as possible and serves to carry the reaction to completion. The charge is stirred for about 30 minutes longer and then blown out into pans to cool. The product is then ground and dried. The softening point is about 80° C. when tested as described below.

In measuring the hardness of this material I find that a good index is the softening point and flowing point. A suitable method for these determinations is described in Allen's Commercial Organic Analysis, Fourth Edition, Volume III, pages 76–77 for the softening and flowing point of asphalts. Briefly, this consists in spreading some of the ground material on a thin microscope slide placed on a mercury bath heated by a small flame. The temperature rise is adjusted to about 2–3° C. per minute. The temperature at which individual granules become rounded and take on a deeper color is taken as the softening point; the temperature at which the material spreads on the glass or "wets" the glass is taken as the flowing point.

I have found that I can prepare a comparably hard product with the zinc chloride alone. In this case the time of treatment is somewhat longer. Whether the catalytic effect shown in my experiments is due to the acidic substances per se, or, to the addition products of these acidic substances with the aniline is immaterial as influencing the scope of this invention. As described in my preferred example the zinc chloride is added to the batch as a catalyst comprising a zinc chloride-aniline compound. Nor do I wish to be limited to any exact proportions of catalyst or reacting components given above. The use of the acidic zinc chloride and hydrochloric acid in preparing these resin type of accelerators admits of the widest application.

The zinc chloride-hydrochloric acid catalyzed product when used as the accelerator in the formula:

Smoked sheet_____ 100 parts by weight
Zinc oxide_____ 5 parts by weight
Sulphur _____ 5 parts by weight
Accelerator _____ 1 part by weight cured at a temperature corresponding to 40 lbs. steam pressure gave the following results:

| Time of cure | Elongation | Load at 700% elong. | Load at break |
|---|---|---|---|
| 30 | 9.5 | 1900 | 2820 |
| 45 | 9.0 | 1700 | 3480 |
| 60 | 9.0 | 2600 | 3880 |
| 75 | 9.1 | 3200 | 3880 |
| 90 | 9.0 | 2300 | 2701 |

I have found that the product prepared as above not only is a good accelerator of the vulcanization of rubber but it also imparts to the rubber very excellent aging properties. The present theory in the art is that the aging of rubber in use is due to an oxidizing action of the air on the rubber. From this standpoint those substances which tend to preserve the rubber, that is, improve its aging qualities have been designated as "antioxidants".

The excellent aging properties of a rubber prepared with the zinc chloride-hydrochloric acid catalyzed product are shown by the following tests made on a rubber prepared as noted above. This rubber was first artificially aged by placing in a chamber heated to 70° C. and passing warm fresh air over the rubber. A sample was tested at the end of each day.

| Days aged | Load at break |
|---|---|
| 0 | 3266 lbs./in.² |
| 1 | 3392 lbs./in.² |
| 2 | 3303 lbs./in.² |
| 3 | 3341 lbs./in.² |
| 4 | 3135 lbs./in.² |
| 5 | 3155 lbs./in.² |
| 6 | 3398 lbs./in.² |
| 7 | 3449 lbs./in.² |

Samples of rubber prepared as above were subjected to the oxygen bomb test. This consisted in treating the specimens at 60° C.

with oxygen at 300 pounds per square inch pressure. The results were as follows:

| Hours in the bomb | Load at break |
|---|---|
| 0 | 3325 lbs./in.² |
| 48 | 3125 lbs./in.² |
| 72 | 2625 lbs./in.² |

This shows excellent aging properties since it has been shown that 10 hours in a bomb under the above conditions is approximately equivalent to one year of natural aging (Bierer and Davis, Ind. Eng. Chem.—August 1925).

The age resisting qualities are further brought out in a second "bomb" test. The rubber for this test was prepared by utilizing the zinc-chloride-hydrochloric acid catalyzed product as prepared above as the accelerator-antioxidant in the formula:

| | |
|---|---|
| Smoked sheet | 100 parts by weight |
| Zinc oxide | 5 parts by weight |
| Sulphur | 5 parts by weight |
| Accelerator antioxidant | 3 parts by weight |

Cured at temperature of steam at 40 lbs./in.² for 30 minutes. Specimens of this rubber were then aged in a bomb at 60° C. in an atmosphere of oxygen at 300 lbs./in.² pressure and the following results obtained.

| Hours in the bomb | Load at break |
|---|---|
| 0 | 3100 lbs./in.² |
| 48 | 3100 lbs./in.² |
| 72 | 3150 lbs./in.² |

What I claim is:

1. A process for treating rubber or similar materials which comprises combining with an unvulcanized rubber compound a vulcanizing agent and the product obtained by reacting under essentially anhydrous conditions, aniline and acetaldehyde in the presence of a small amount of zinc chloride, and vulcanizing.

2. A process for treating rubber or similar materials which comprises combining with an unvulcanized rubber compound, a vulcanizing agent and the product obtained by reacting under essentially anhydrous conditions, aniline and acetaldehyde in the presence of a small amount of zinc chloride, a small amount of mineral acid, and vulcanizing.

3. A process for treating rubber or similar materials which comprises combining with an unvulcanized rubber compound, a vulcanizing agent and the product obtained by reacting under essentially anhydrous conditions, aniline and acetaldehyde in the presence of a small amount of zinc chloride, a small amount of hydrochloric acid, and vulcanizing.

4. A process for treating rubber or similar materials which comprises combining with an unvulcanized rubber compound a vulcanizing agent and the product obtained by reacting under essentially anhydrous conditions, two moles of acetaldehyde and one mole of aniline, a small amount of zinc chloride, a small amount of a mineral acid, and vulcanizing.

5. A process for treating rubber or similar materials which comprises combining with an unvulcanized rubber compound a vulcanizing agent and the product obtained by partially condensing under essentially anhydrous conditions two moles of acetaldehyde with one mole of aniline in the presence of zinc chloride then completing the condensation by a small amount of HCl, and vulcanizing.

6. A vulcanized rubber derived from unvulcanized rubber or similar material by combining it with a vulcanizing agent and the product obtained by reacting under essentially anhydrous conditions, aniline and acetaldehyde in the presence of a small amount of zinc chloride, and vulcanizing.

7. A vulcanized rubber derived from unvulcanized rubber or similar material by combining it with a vulcanizing agent and the product obtained by reacting under essentially anhydrous conditions, aniline and acetaldehyde in the presence of a small amount of zinc chloride, a small amount of mineral acid, and vulcanizing.

8. A vulcanized rubber derived from unvulcanized rubber or similar material by combining it with a vulcanizing agent and the product obtained by reacting under essentially anhydrous conditions, aniline and acetaldehyde in the presence of a small amount of zinc chloride, a small amount of hydrochloric acid, and vulcanizing.

9. A vulcanized rubber derived from unvulcanized rubber or similar material combined with a vulcanizing agent and the product obtained by reacting under essentially anhydrous conditions, two moles of acetaldehyde and one mole of aniline, a small amount of zinc chloride, a small amount of a mineral acid, and then vulcanized.

10. A vulcanized rubber derived from unvulcanized rubber or similar material combined with a vulcanizing agent and the product obtained by partially condensing under essentially anhydrous conditions, two moles of acetaldehyde with one mole of aniline in the presence of zinc chloride then completing the condensation by a small amount of HCl, and then vulcanized.

11. Process of treating rubber or similar materials which comprises combining with an unvulcanized rubber compound, a vulcanizing agent and an aniline acetaldehyde condensation product containing zinc chloride.

12. Process of treating rubber or similar materials which comprises combining with an unvulcanized rubber compound, a vulcanizing agent and the condensation product of aniline and acetaldehyde containing essentially two moles of acetaldehyde, one mole of aniline and zinc chloride.

Signed at Perth Amboy, in the county of Middlesex and State of New Jersey, this 18th day of January, A. D. 1926.

ADRIEN CAMBRON.